INVENTORS.
JOHN A. KAUFFMANN
ROBERT M. TOMASULO
BY
William V. Schelberg
AGENT

May 23, 1961 J. A. KAUFFMANN ET AL 2,985,868

MAGNETIC NEITHER NOR CIRCUIT

Filed Nov. 4, 1957

2 Sheets-Sheet 2

United States Patent Office 2,985,868
Patented May 23, 1961

2,985,868

MAGNETIC NEITHER NOR CIRCUIT

John A. Kauffmann, Hyde Park, and Robert M. Tomasulo, Poughkeepsie, N.Y., assignors to International Business Machines Corporation, New York, N.Y., a corporation of New York Filed Nov. 4, 1957, Ser. No. 694,318

9 Claims. (Cl. 340—174)

This invention relates to binary switching circuits and more particularly to a Neither Nor logical switching circuit which employs magnetic cores.

In a copending application, Serial No. 689,827, filed on October 10, 1957, in behalf of John A. Kauffmann, which application is assigned to the same assignee, a universal magnetic switching circuit is described which utilizes a so called inhibit core which is set and reset in every cycle of operation. The output winding of this inhibit core is connected series opposed to the output winding of an input core, or cores, so as to oppose the voltage induced in the output winding of the input core whenever it is set by an input variable. Further, each input variable is directed to a separate input coupling core so that flux reversal, and therefore the induced output voltages therefrom coincide in time thereby insuring cancellation. In accordance with the present invention, the necessity for providing a separate input core is eliminated in performing the logical function of Neither Nor.

Accordingly, it is one broad objective of this invention to provide a new and improved binary switching circuit.

A more specific object of this invention is to provide an improved Neither Nor logical switching circuit.

These and other objects are realized, as is shown in the preferred embodiments herein disclosed, by constructing a Neither Nor circuit wherein each input variable is coupled with a single input core. The input variables may occur singularly or coincidently in a determinable instance of time, wherein each singular variable input of itself is capable of causing complete flux reversal within the input core. The input core is provided with an output winding connected serially opposed to an output winding on an inhibit core. This inhibit core is adapted to be set and reset in every cycle of operation coincidently within the determinable time for input and reset, respectively, of the input core. Whenever a singular input is available to set the input core, switching takes place in a given instance of time which provides a voltage output of given value in the output winding within a similar instance of time. Correspondingly, the inhibit core is set every cycle to induce a voltage which is effectively equal and opposite to that voltage induced in the output winding on the input core. However, if both input variables are present to coincidently set the input core, switching takes place in a shorter interval of time so as to induce a voltage in the output winding whose magnitude tends to be twice as large, tending to occur in a shorter interval of time, when compared with the previous case where only a singular input variable was actuated. The inhibit core again tends to block this induced voltage although it is being set at a slower rate commensurate with a singular setting signal.

Another object of this invention is to provide a logical circuit wherein a core may be set, in accordance with the number of input variables connected thereto, at different rates of speed.

Still another object of this invention is to provide a logical Neither Nor circuit which is adapted to receive input pulses over a selectable time interval and to produce an output indication at a selectable time.

Other objects of the invention will be pointed out in the following description and claims and illustrated in the accompanying drawings, which disclose, by way of example, the principle of the invention and the best mode, which has been contemplated, of applying that principle.

Figure 1:
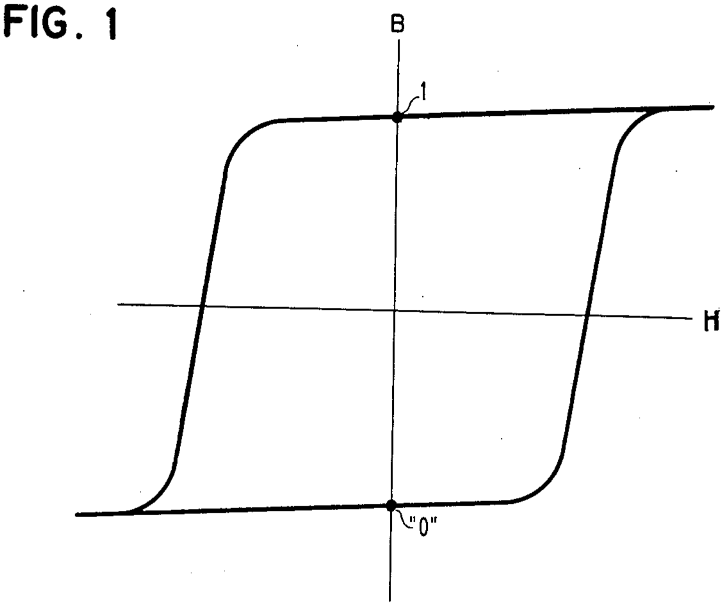
Fig. 1 is a representation of the hysteresis characteristic obtained for a magnetic material of the type employed.

Referring to Figure 1, the curve illustrated comprises a plot of flux density versus applied field for a magnetic core having a substantially rectangular hysteresis characteristic. The opposite remanence states are conventionally employed for representing binary information conditions and are arbitrarily designated as "0" and "1." With a "0" stored, a pulse applied to a winding linking the core in proper sense causes the loop to be traversed and the remanence state "1" is attained when the pulse terminates. Such a pulse is hereinafter referred to as a "write" pulse. Similarly, the core is read out or returned to the "0" state in determining what information has been stored by applying a pulse in the reverse sense to the same or another winding, hereinafter referred to as a "read" pulse. Should a "1" have been stored, a large flux change occurs with the shift from "1" to "0" with a corresponding voltage of relatively large magnitude developed on an output winding. On the other hand, should a "0" have been stored, little flux change occurs and negligible signal is developed on the output winding.

It should be further understood, that in a core of uniform cross-sectional area the amount of flux which may be switched is quantified. However, for a given core having a fixed number of turns in an input winding and a fixed number of turns in an output winding, the voltage induced in the output winding is determined by the integral of $Nd\phi/dt$ wherein N is a fixed constant and the expression $d\phi/dt$ is the change of flux with respect to time. A given input signal sufficient to fully switch such a core from one limiting state to another will then induce a voltage of given magnitude within a determinable time interval. If, however, twice the given input signal were to be applied to the same input winding or a further input signal were applied coincidently to another input winding linking the core with the same number of turns, although the amount of flux change within the core is quantified, the rate of flux change with respect to time is increased to approximately twice the previous case. Since the number of turns in the output winding is fixed, and the change of flux ($d\phi$) within the same time increment ($dt$) has doubled, and the induced output voltage is then twice the magnitude while occurring in one half the time interval, as compared with the former case.

Figure 2:
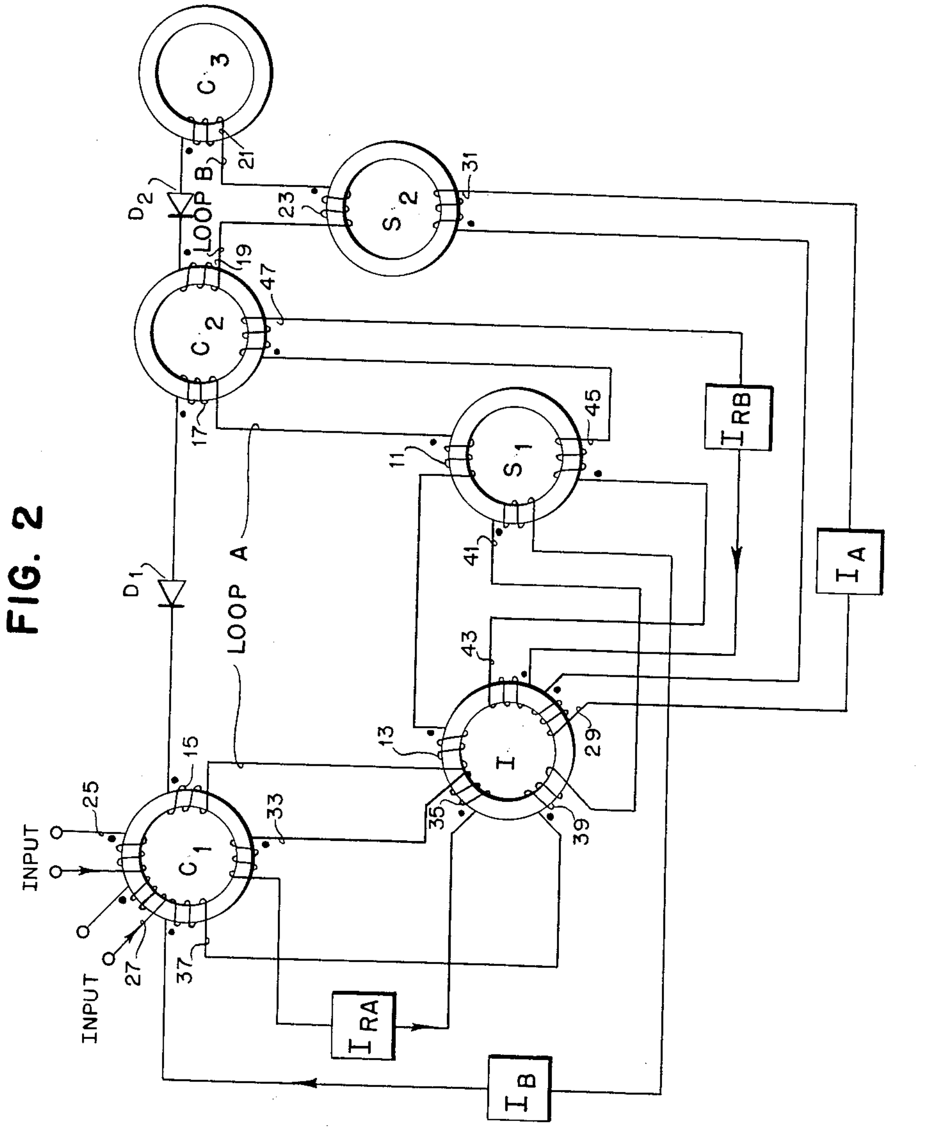
Fig. 2 is a circuit diagram of a magnetic Neither Nor circuit in accordance with this invention.

A dot is shown adjacent one terminal of each of the windings illustrated in Figure 2, indicating its winding direction. A write pulse is a positive pulse which is directed into the undotted end of the winding terminal which tends to store a "1," while a read pulse, which is also referred to as a "reset" pulse, is a positive pulse directed into the dotted end of the winding terminal and tends to apply a negative field or store a "0."

The circuit arrangement disclosed herein employs input and output coupling magnetic cores and an inhibit core arranged intermediate to so called "storage magnetic cores" which store certain logical information and these arrangements are adapted to be interconnected with each other similar type circuitry through such coupling cores.

The coupling cores and inhibit core may be fabricated of ferrite materials of the same type used for the storage cores, however, it is not essential that these cores exhibit the rectangular hysteresis characteristic required of the storage or memory cores as these devices function as variable impedance elements in controlling the transfer of information pulses, as will be more evident from the following description. Such interconnecting coupling cores and inhibit core are illustrated in the subsequently described and depicted circuit which are labeled $C_1$, $C_2$, $C_3$ and I for clarity.

Referring again to Figure 2, a core $S_1$ is provided with a winding 11 interconnected with an output winding 13 of the core I, an output winding 15 of the core $C_1$, and an input winding 17 of the core $C_2$ through a diode $D_1$. This circuit interconnection is hereinafter referred to as loop A. The core $C_2$ is further provided with an output winding 19 which is interconnected with an input winding 21 on the core $C_3$ through a diode $D_2$, wherein the core $C_3$ represents a further coupling core that may be coupled to a storage core $S_2$ through a winding 23 series connected to the winding 19, and which interconnection is hereinafter referred to as loop B.

The storage core $S_1$ is adapted to receive information pulses transferred to it through the coupling core $C_1$ and inhibit core I, which information, in turn, is transferred from the core $S_1$ through the coupling core $C_2$ to a following circuit. The storage core $S_2$ is representative of a storage core in such following stage and thus receives information transferred representing the logical function of Neither Nor. Input signals are applied to the core $C_1$ by means of input windings designated 25 and 27. The cores I and $S_2$ are energized from a clock pulse source $I_A$ and the cores $C_1$ and I are energized from a clock pulse source $I_{RA}$. The cores $C_1$, I and $S_1$ are energized from a clock pulse source $I_B$, and the cores I, $C_2$ and $S_1$ are energized from a clock pulse source $I_{RB}$. A winding 29 is provided on the core I and a winding 31 is provided on the core $S_2$ which windings are series connected with the source $I_A$. Similarly, a winding 33 on the core $C_1$, and a winding 35 on the core I is series connected with the source $I_{RA}$, while a winding 37 on the core $C_1$, a winding 39 on the core I and a winding 41 on the core $S_1$ is series connected with the source $I_B$, and a winding 43 on the core I, a winding 45 on the core $S_1$ and a winding 47 on the core $C_2$ is series connected with the source $I_{RB}$.

Figure 3:
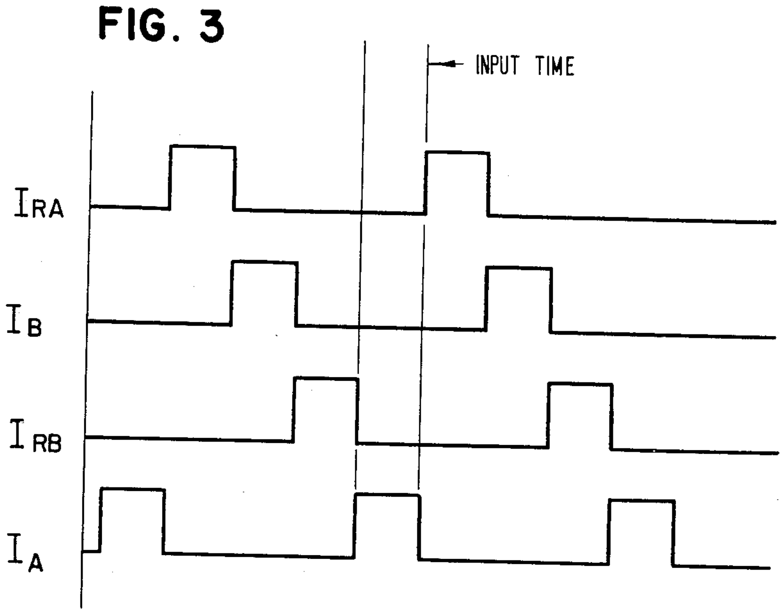
Fig. 3 illustrates the relative timing of current pulses which are required for operating the circuit of Figure 2.

The sequence of pulses provided by the several clock pulse sources described above is indicated in Figure 3 and it will be observed that the time of appearance of an input pulse occurs at the time the $I_A$ clock pulse appears. Further, each of the several clock pulse sources provides an effective open circuit connection when not actuated.

Referring to Figure 2, consider as an initial condition that all the cores shown are at the lower remanence condition "0" shown in Figure 1. For the first operation of the circuit, assume an input signal is directed into the undotted end of the winding 25 on the core $C_1$. This signal switches the core $C_1$ toward the "1" state and in so doing induces a voltage on the output winding 15 with the undotted end positive. At the same time, the $I_A$ clock pulse source directs a write signal into the winding 29 on the core I which induces a voltage on the output winding 13 with the undotted end positive. The induced voltages effectively cancel and negligible current flows in the loop A. When the $I_A$ clock pulse terminates the $I_{RA}$ clock pulse source directs a reset signal into the windings 33 and 35 on the cores $C_1$ and I, respectively. This reset signal switches the cores $C_1$ and I toward the "0" state and in so doing induces a voltage on each of the output windings 15 and 13 with the dotted end positive. The induced voltages again effectively cancel and negligible current flow is experienced in the loop A. Next, the $I_B$ clock pulse source directs a reset signal into the windings 37, 39 and 41 on the core $C_1$, I and $S_1$ respectively. Since the cores $C_1$, $I_1$ and $S_1$ are already in the "0" state, this signal has negligible effects. Subsequently, the clock pulse source $I_{RB}$ directs a reset signal into the windings 43, 45 and 47 on the cores I, $S_1$ and $C_2$, respectively. Similarly, since the cores are already in the "0" state, the $I_{RB}$ signal has negligible effect. Thus the input signal applied to the circuit produces no signal at the output terminals.

The input winding 27, like the winding 25 on the core $C_1$ is adapted to switch the core $C_1$ from the "0" to the "1" state upon application of a signal into the undotted end of the winding. If, in the next cycle of operation, an input were directed into the winding 27 on the core $C_1$, the operation of the circuit is as described above in that the circuit produces no signal output when a signal input is present to either one of the input terminals.

Assume, in the next cycle of operation, an input signal is directed into the windings 25 and 27 in such a direction as to write the core $C_1$. Since the core $C_1$ is now switched from the "0" toward the "1" state by twice the number of ampere turns, switching tends to be accomplished within approximately half the time as in the previous examples, while the voltage magnitude induced in the winding 15 tends to be twice that induced when a singular input is present. Coincidently, the $I_A$ clock pulse source has directed a write signal into the winding 29 on the core I which starts switching the core I from the "0" toward the "1" state. The core $C_1$, in switching faster, induces a voltage on the output winding 15 with the undotted end positive causing a counter-clockwise current in the loop A which is directed into the undotted end of the winding 13 on the core I. This current in loop A tends to write the core I and thus aids in speeding up its switching to the "1" state. Thus, the induced voltages on the windings 15 and 13 on the cores $C_1$ and I, respectively, reach approximate equality, and there is a negligible voltage drop across the remainder of the elements in loop A. Subsequently, the $I_{RA}$ clock pulse directs a reset signal into the windings 33 and 35 on the cores $C_1$ and I, respectively, to reset the cores to the "0" state. The cores $C_1$ and I in resetting induce a voltage on the output windings 15 and 13, respectively, with the undotted end positive. The induced voltages again effectively cancel and negligible current flow is experienced in loop A. Further operation of the $I_B$ and $I_{RB}$ clock pulse sources have the same effect as previously described and no signal is experienced at the output terminals since the core $S_1$ is left in the "0" state at the termination of the $I_{RA}$ clock pulse.

Assume now, there is an absence of input to the circuit. The $I_A$ clock pulse directs a write signal into the winding 29 on the core I which switches the core from the "0" to the "1" state and in so doing induces a voltage in the output winding 13 with the undotted end positive tending to cause a clockwise current flow in loop A, which is blocked and dissipated by the diode $D_1$. Next, the $I_{RA}$ clock pulse source directs a reset signal into the windings 33 and 35 on the cores $C_1$ and I, respectively. This reset signal switches the core I from the "1" to the "0" state and in so doing induces a voltage on the output winding 13 with the dotted end positive causing a counter-clockwise current flow in loop A which writes the core $S_1$. The $I_B$ clock pulse source now directs a reset signal into the windings 37, 39 and 41 on the cores $C_1$, I and $S_1$, respectively, which switches the core $S_1$ from the "1" to the "0" state. The core $S_1$ switching to the "0" state induces a voltage on the output winding 11 with the dotted end positive causing a counter-clockwise current flow in loop A, which tends to write the core $C_2$ and I, while tending to read the core $C_1$. The core $C_1$ and the core I are held in the "0" state by the $I_B$ drive allowing the core $C_2$ to switch from the "0"

state to the "1" state. The core $C_2$ in switching to the "1" state induces a voltage on the output winding 19 with the undotted end positive causing a counter-clockwise current flow in loop B which is directed into the undotted end of the winding 23 on the core $S_2$. This counter-clockwise current flow in loop B then switches the core $S_2$ from the "0" to the "1" state. The $I_{RB}$ clock pulse source subsequently directs a read signal into the windings 43, 45 and 47 on the cores I, $S_1$ and $C_2$, respectively, which switches the core $C_2$ from the "1" to the "0" state and in so doing induces a voltage on the windings 17 and 19 with the dotted end positive tending to cause a clockwise current flow in loop B which is blocked and dissipated by the diode $D_2$ and causing a counter-clockwise current flow in loop A. This counter-clockwise current flow in loop A tends to read the core $C_1$ and write the cores I and $S_1$. Since the core $C_1$ is already in the "0" state, it is unaffected, while the cores I and $S_1$ are held in the "0" state by their $I_{RB}$ drive. Thus, when there is an absence of inputs to the circuit a signal is delivered at the output terminals to perform the function of Neither Nor.

Upon consideration of the preferred embodiment described above, the winding 37 on the core $C_1$ is seen to serve only to bias the core $C_1$ toward the "0" state upon energization by the $I_B$ clock pulse. During application of the $I_B$ clock pulse, if current is present in the loop A, it is flowing in a counter-clockwise direction which tends to read the core $C_1$. Since the core $C_1$ was previously reset to the "0" state by application of the $I_{RA}$ clock pulse into the winding 33, the necessity of biasing the core $C_1$ during the duration of the $I_B$ clock pulse vanishes. However, this particular embodiment is utilized as a refinement to insure proper operation when similar type circuitry is connected with each of the input windings 25 and 27.

In the interest of providing a complete disclosure, details of one embodiment of the Neither Nor device wherein ferrite cores are employed is given below, however, it is to be understood that other component values and current magnitudes may be employed with satisfactory operation attained so that the values given should not be considered limiting.

With the clock pulse currents $I_A$ and $I_B$ delivering a constant current of 1.9 amperes, the winding 29 may comprise four turns, the windings 31 and 41 ten turns and the windings 37 and 39 may comprise five turns. With the clock pulse currents $I_{RA}$ and $I_{RB}$ delivering a constant current of 1.4 amperes, the windings 33, 35, 43, 45 and 47 may comprise five turns. In the coupling circuits interconnecting the storage and coupling cores, the windings 13, 15 and 19 may comprise twelve turns, the windings 11 and 23 may comprise ten turns, the windings 17 and 21 may comprise five turns and the windings 25 and 27 may comprise five turns, with the diodes $D_1$ and $D_2$ of the type 1N270 manufactured by the Transitorn Company.

Each of the cores S, C and I may comprise toroids of magnesium-manganese ferrite composition having an outside diameter of 0.100 inch, inside diameter of 0.070 inch and thickness of 0.120 inch. This thickness may be obtained by stacking four cores each of 0.030 inch thickness and winding the stack as a single core unit.

It may be pointed out that the storage, inhibit and coupling cores may be of square loop type magnetic material and in such instances a bias current may be provided to a further winding inductively associated with each of them individually which biases the cores through their positive threshold (or write "1" direction) in speeding up the operation of the system.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the following claims.

What is claimed is:

1. A logical Neither Nor circuit comprising a magnetic storage core, control winding means on said storage core; a first and a second coupling core and an inhibit core; input and output winding means on said second coupling core; output winding means on said inhibit core; each of said cores capable of attaining different stable states of residual flux density; a first and a second input winding means and an output winding means on said first coupling core; circuit means including a diode series connecting said output winding means on said first coupling core and said inhibit core, said control winding means and said input winding means on said second coupling core; a first, a second, third and fourth clock pulse source adapted to deliver a series of pulses displaced in time; winding means on said first coupling core and said inhibit core connected with said first clock pulse source so as to cause said first coupling core and said inhibit core to shift to a zero remanence state when energized; further winding means on said inhibit core and said storage core connected with said second clock pulse source so as to cause said inhibit core and said storage core to shift to the zero state when energized; additional shift winding means on said inhibit core, said storage core and said second coupling core connected with said third clock pulse source so as to cause said inhibit core, said storage core and said second coupling core to shift to the zero state when energized; and winding means on said inhibit core connected with said fourth clock pulse source to cause said inhibit core to shift to a one remanence state when energized.

2. A magnetic Neither Nor circuit comprising in combination a magnetic storage core capable of assuming alternate stable residual states in representing binary information and having a switching threshold; control winding means on said storage core, a first and a second coupling core and an inhibit core; each of said cores capable of attaining different stable states of residual flux density; a first and a second input winding means on said first coupling core, each adapted to switch said first coupling core to a one state when energized; output winding means on said first coupling core and said inhibit core; input and output winding means on said second coupling core; circuit means including an asymmetrical impedance device connecting said output winding means on said first coupling core and said inhibit core, said control winding means and said input winding means on said second coupling core; shift winding means on said first coupling core and said inhibit core adapted to be energized simultaneously to drive said first coupling core and said inhibit core toward a datum residual state; additional shift winding means on said inhibit core and said storage core adapted to be energized simultaneously and to drive said inhibit core and said storage core to the datum residual state; further shift winding means on said inhibit core, said storage core and said second coupling core adapted to be energized simultaneously and to drive said inhibit core, said storage core and said second coupling core toward the datum residual state; and shift winding means on said inhibit core adapted to be energized and drive said inhibit core toward the one residual state.

3. A magnetic Neither Nor circuit comprising in combination a magnetic storage core; control winding means on said storage core, a first and a second coupling core and an inhibit core; each of said cores capable of attaining different stable states of residual flux density; a first and a second input winding means on said first coupling core, each adapted to switch said first coupling core to a one state when energized; output winding means on said first coupling core and said inhibit core; input and output winding means on said second coupling core; circuit means including an asymmetrical impedance device connecting said output winding means on said first coupling core and said inhibit core, said control winding means and said input winding means on said second coupling core; shift winding means on said first coupling core series connected to shift winding means on said inhibit core adapted to drive said first coupling core and said inhibit core to a datum residual state when energized from a first clock pulse source; additional shift winding means on said inhibit core series connected to shift winding means on said storage core adapted to drive said inhibit core and said storage core to the datum residual state when energized from a second clock pulse source; further shift winding means on said inhibit core series connected to shift winding means on said storage core and shift winding means on said second coupling core adapted to drive said inhibit core, said storage core and said second coupling core toward the datum residual state when energized by a third clock pulse source; and winding means on said inhibit core adapted to drive said inhibit core toward the one residual state when energized from a fourth clock pulse source.

4. A magnetic Neither Nor circuit comprising in combination a magnetic storage core; control winding means on said storage core; a first and a second coupling core and an inhibit core; each of said cores capable of attaining different stable states of residual flux density; a first and a second input winding means on said first coupling core, each adapted to switch said first coupling core to a one state when energized; output winding means on said first coupling core and said inhibit core; input and output winding means on said second coupling core; circuit means including an asymmetrical impedance device connecting said output winding means on said first coupling core and said inhibit core, said control winding means and said input winding means on said second coupling core; shift winding means on said first coupling core series connected to shift winding means on said inhibit core adapted to drive said first coupling core and said inhibit core to a datum residual state when energized from a first clock pulse source; additional shift winding means on said inhibit core series connected to shift winding means on said storage core adapted to drive said inhibit core and said storage core to the datum residual state when energized from a second clock pulse source; further shift winding means on said inhibit core series connected to shift winding means on said storage core and shift winding means on said second coupling core adapted to drive said inhibit core, said storage core and said second coupling core toward the datum residual state when energized by a third clock pulse source; winding means on said inhibit core adapted to drive said inhibit core toward the one residual state when energized from a fourth clock pulse source; and means for biasing at least said storage core toward said opposite residual state.

5. A magnetic Neither Nor circuit comprising in combination a magnetic storage core; control winding means on said storage core, a first and a second coupling core and an inhibit core; each of said cores capable of attaining different stable states of residual flux density; a first and a second input winding means on said first coupling core, each adapted to switch said first coupling core to a one state when energized; output winding means on said first coupling core and said inhibit core; input and output winding means on said second coupling core; circuit means connecting said output winding means on said first coupling core and said inhibit core, said control winding means and said input winding means on said second coupling core; shift winding means on said first coupling core series connected to shift winding means on said inhibit core adapted to drive said first coupling core and said inhibit core to a datum residual state when energized from a first clock pulse source; additional shift winding means on said inhibit core series connected to shift winding means on said storage core adapted to drive said inhibit core and said storage core to the datum residual state when energized from a second clock pulse source; further shift winding means on said inhibit core series connected to shift winding means on said storage core and shift winding means on said second coupling core adapted to drive said inhibit core, said storage core and said second coupling core toward the datum residual state when energized by a third clock pulse source; winding means on said inhibit core adapted to drive said inhibit core toward the one residual state when energized from a fourth clock pulse source; and means for energizing said shift winding means including said first, said second, third and fourth clock pulse sources wherein said sources are actuated in sequence in the order named.

6. A magnetic Neither Nor circuit comprising a magnetic storage core; a first and a second coupling core and an inhibit core; each of said cores being formed of material having substantially rectangular hysteresis characteristics with a switching threshold; control winding means on said storage core; a first and a second input winding means on said first coupling core, each adapted to switch said first coupling core to a one state when energized; output winding means on said first coupling core and said inhibit core; input and output winding means on said second coupling core; circuit means connecting said output winding means on said first coupling core and said inhibit core, said control winding means and said input winding means on said second coupling core; shift winding means on said first coupling core series connected to shift winding means on said inhibit core adapted to drive said first coupling core and said inhibit core to a datum residual state when energized from a first clock pulse source; additional shift winding means on said inhibit core series connected to shift winding means on said storage core adapted to drive said inhibit core and said storage core to the datum residual state when energized from a second clock pulse source; further shift winding means on said inhibit core series connected to shift winding means on said storage core and shift winding means on said second coupling core adapted to drive said inhibit core, said storage core and said second coupling core toward the datum residual state when energized by a third clock pulse source; winding means on said inhibit core adapted to drive said inhibit core toward the one residual state when energized from a fourth clock pulse source; and means for biasing said cores toward said opposite residual state.

7. A magnetic Neither Nor circuit comprising a magnetic storage core; a first and a second coupling core and an inhibit core; each of said cores being formed of material having substantially rectangular hysteresis characteristics with a switching threshold; control winding means on said storage core; a first and a second input winding means on said first coupling core, each adapted to switch said first coupling core to a one state when energized; output winding means on said first coupling core and said inhibit core; input and output winding means on said second coupling core; circuit means connecting said output winding means on said first coupling core and said inhibit core, said control winding means and said input winding means on said second coupling core; shift winding means on said first coupling core series connected to shift winding means on said inhibit core adapted to drive said first coupling core and said inhibit core to a datum residual state when energized from a first clock pulse source; additional shift winding means on said inhibit core series connected to shift winding means on said storage core adapted to drive said inhibit core and said storage core to the datum residual state when energized from a second clock pulse source; further shift winding means on said inhibit core series connected to shift winding means on said storage core and shift winding means on said second coupling core adapted to drive said inhibit core, said storage core and said second coupling core toward the datum residual state when energized by a third clock pulse source; winding means on said inhibit core adapted to drive said inhibit core toward the one residual state when energized from a fourth clock pulse source; and means for energizing said shift winding means including said first, said second, third and fourth clock pulse sources wherein said sources are actuated in sequence in the order named.

8. A magnetic Neither Nor circuit comprising a magnetic storage core; a first and a second coupling core and an inhibit core; each of said cores being formed of material having substantially rectangular hysteresis characteristics with a switching threshold; control winding means on said storage core; a first and a second input winding means on said first coupling core, each adapted to switch said first coupling core to a one state when energized; output winding means on said first coupling core and said inhibit core; input and output winding means on said second coupling core; circuit means connecting said output winding means on said first coupling core and said inhibit core, said control winding means and said input winding means on said second coupling core; shift winding means on said first coupling core series connected to shift winding means on said inhibit core adapted to drive said first coupling core and said inhibit core to a datum residual state when energized from a first clock pulse source; additional shift winding means on said inhibit core series connected to shift winding means on said storage core adapted to drive said inhibit core and said storage core to the datum residual state when energized from a second clock pulse source; further shift winding means on said inhibit core series connected to shift winding means on said storage core and shift winding means on said second coupling core adapted to drive said inhibit core, said storage core and said second coupling core toward the datum residual state when energized by a third clock pulse source; winding means on said inhibit core adapted to drive said inhibit core toward the one residual state when energized from a fourth clock pulse source; means for biasing said cores toward said opposite residual state; and means for energizing said shift winding means including said first, said second, third and fourth clock pulse source wherein said sources are actuated in sequence in the order named.

9. A logical circuit having at least one input core and one inhibit core each capable of attaining a first and a second limiting state of residual flux density; output winding means on each of said cores; circuit means connecting the output winding means on said input core serially opposed to the output winding means on said inhibit core; at least a first and a second input winding means on said input core each adapted to switch said input core to the first limiting state when energized; means for switching said inhibit core to the first limiting state coincidently with energization of said input winding means; and means for resetting said cores to the second limiting state of residual flux density.

References Cited in the file of this patent

UNITED STATES PATENTS

| | | |
|---|---|---|
| 2,666,151 | Rajchman et al. | Jan. 12, 1954 |
| 2,801,344 | Lubkin | July 30, 1957 |
| 2,904,779 | Russell | Sept. 15, 1959 |